US008682288B2

(12) United States Patent
Kong et al.

(10) Patent No.: US 8,682,288 B2
(45) Date of Patent: Mar. 25, 2014

(54) CALL LIST TRANSMISSION PROCESSING METHOD AND SYSTEM OF CHARGING SYSTEM

(75) Inventors: Peng Kong, Shenzhen (CN); Junjing Hong, Shenzhen (CN); Chun Wang, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 89 days.

(21) Appl. No.: 13/378,144

(22) PCT Filed: Oct. 15, 2009

(86) PCT No.: PCT/CN2009/074471
§ 371 (c)(1),
(2), (4) Date: Dec. 14, 2011

(87) PCT Pub. No.: WO2010/145108
PCT Pub. Date: Dec. 23, 2010

(65) Prior Publication Data
US 2012/0088471 A1 Apr. 12, 2012

(30) Foreign Application Priority Data

Jun. 15, 2009 (CN) .......................... 2009 1 0148345

(51) Int. Cl.
*H04M 11/00* (2006.01)
(52) U.S. Cl.
USPC . 455/406; 455/405; 379/114.01; 379/114.05; 379/114.03; 379/114.04
(58) Field of Classification Search
USPC ................ 455/406, 405; 379/114.01, 114.05, 379/114.03, 114.04
See application file for complete search history.

(56) References Cited

U.S. PATENT DOCUMENTS

| 7,369,650 | B1 * | 5/2008 | Bhusri ...................... 379/114.14 |
| 7,991,132 | B2 | 8/2011 | Yang |
| 2001/0024950 | A1 * | 9/2001 | Hakala et al. ................. 455/406 |

(Continued)

FOREIGN PATENT DOCUMENTS

| CN | 1556634 A | 12/2004 |
| CN | 1929386 A | 3/2007 |
| CN | 1968313 A | 5/2007 |

OTHER PUBLICATIONS

N. Brownlee; A. Blount;"Accounting Attributes and Record Formats"; Sep. 2000.*

(Continued)

*Primary Examiner* — Khai M Nguyen
(74) *Attorney, Agent, or Firm* — Brooks Kushman P.C.

(57) ABSTRACT

A method and a system for processing call detail record transmission in a charging system. The method includes: a service processing node detecting a load status of a transmission link after receiving a call detail record generated by a service program, if the transmission link is idle is detected, sending the received call detail record to a charging server; or else storing the received call detail record in a first storage area in the service processing node as a stocked call detail record file; and the charging server detecting a load status of a call detail record processing module after receiving the call detail record sent by the service processing node, if the call detail record processing module is not idle is detected, storing the received call detail record in a second storage area in the charging server as a stocked call detail record file.

20 Claims, 2 Drawing Sheets

(56) References Cited

U.S. PATENT DOCUMENTS

2003/0105864 A1* 6/2003 Mulligan et al. .............. 709/225
2003/0123628 A1* 7/2003 Rhodes .................... 379/114.01
2004/0142679 A1* 7/2004 Kearns et al. ................. 455/406
2004/0193513 A1* 9/2004 Pruss et al. ...................... 705/30
2006/0052083 A1* 3/2006 Choi et al. .................... 455/406
2006/0115060 A1* 6/2006 Benco et al. ............. 379/114.01
2011/0223882 A1* 9/2011 Hellgren ...................... 455/406

OTHER PUBLICATIONS

International Search Report for PCT/CN2009/074471, English translation attached to original, Both completed by the Chinese Patent Office on Mar. 3, 2010, All together 6 pages.

* cited by examiner

CALL LIST TRANSMISSION PROCESSING METHOD AND SYSTEM OF CHARGING SYSTEM

CROSS-REFERENCE TO RELATED APPLICATION

This application is the U.S. national phase of PCT Appln. No. PCT/CN2009/074471 filed Oct. 15, 2009 which claims priority to Chinese Application No. 200910148345.0 filed Jun. 15, 2009, the disclosures of which are incorporated in their entirety by reference herein.

TECHNICAL FIELD

The present invention relates to the field of the communication technique, and more especially, to a method and a system for processing bill detail record transmission in a charging system.

BACKGROUND OF THE RELATED ART

The charging system of the communication network can be generally divided into two parts of the charging front end and the charging back end. The charging front end usually runs on the service processor of the communication network, such as the Mobile Switching Center (MSC), the Short Message Service Center (SMSC), and the Mobile Local Switch (MLS), etc. The charging back end usually runs on the charging server. The charging front end generates all kinds of call detail record messages for all kinds of services (including calling, sending short messages, and data services, etc.), and then transmits them to the charging back end through the network. The charging back end performs all kinds of processing on the call detail records, and generates all kinds of specific formats of call detail record files at last. The settlement platform and accounting system of operators can perform charging and statistics of the corresponding service after obtaining these processed call detail records.

Due to the particularity of the charging system relating to the most direct benefits of operators and networks, it is requested that the charging system of the communication network should have higher reliability, which reflects in that: the call detail record can not be lost in the transmission process, the call detail record can not introduce errors in the transmission process, the call detail record can not be lost in the situation that the charging server is full load when the traffic is large, and the call detail record can not be lost in the situation of the transmission network fault.

At present, along with the continuous increase of the communication traffic, the higher requirement is presented for the charging system of each communication service. The increasing traffic requests that the charging server can process more call detail records rapidly in unit time, or else, the call detail records that transmitted by the service processor will be lost. Although the continuous increase of the traffic can be satisfied to a certain extent by changing the charging server with the higher performance, the distribution of the communication network traffic in time is extremely not uniform. The traffic at daytime is a plurality of times that at nighttime, the traffic at festivals and holidays is a plurality of times that on weekdays, and especially the traffic of short massages will achieve a peak value of the whole year during the spring festival. If the peak value traffic is blindly satisfied by changing the charging server, it will cause the increase of the construction cost and operation cost of operators, and finally it will damage the benefits of network users. Therefore, it is necessary to provide a technique for processing call detail record transmission which can adapt to the characteristics of the communication network charging system.

SUMMARY OF THE INVENTION

The technical problem to be solved in the present invention is to provide a method and a system for processing call detail record transmission in a charging system, so as to ensure the reliability of call detail record transmission and balance the requirements of the traffic increase and the server performance.

In order to solve the foregoing problem, the present invention provides a method for processing call detail record transmission in a charging system, which comprises:

a service processing node detecting a load status of a transmission link after receiving a call detail record generated by a service program, if the transmission link is idle is detected, sending the received call detail record to a charging server; or else storing the received call detail record in a first storage area in the service processing node as a stocked call detail record file; and the charging server detecting a load status of a call detail record processing module after receiving the call detail record sent by the service processing node, if the call detail record processing module is idle is detected, sending the received call detail record to the call detail record processing module to be processed; or else storing the received call detail record in a second storage area in the charging server as a stocked call detail record file.

Furthermore, when the charging server receives the call detail record sent by the service processing node, the charging server detects the received call detail record, if the call detail record is received correctly is detected, then sends a transmission success response to the service processing node; or else, sends a transmission failure response to the service processing node, and includes a request for retransmitting the call detail record in the transmission failure response; and after the service processing node sending one call detail record by the transmission link, if the transmission success response of the sent call detail record is received, then sets a status of the transmission link to be idle, waits for sending a next call detail record; if the transmission failure response is received, then retransmits the sent call detail record.

Furthermore, after completing to send all of the received call detail records, if the transmission link is still idle is detected, then the service processing node reads a stocked call detail record file in the first storage area to send to the charging server by the transmission link.

Furthermore, after sending one call detail record in the stocked call detail record file at each time and receiving the transmission success response of the stocked call detail record, the service processor deletes the stocked call detail record file corresponding to the stocked call detail record in the first storage area.

Furthermore, the transmission link is idle refers that a sending buffer of the transmission link has an idle space.

Furthermore, the call detail record processing module is idle refers that a processing buffer of the call detail record processing module has an idle space.

Furthermore, after completing to send all the received call detail records to the call detail record processing module, if the call detail record processing module is still idle is detected, then the charging server reads a stocked call detail record file in the second storage area to send to the call detail record processing module.

the charging server performs following detection on the received call detail record: the charging server performing Cyclic Redundancy Check (CRC) for ensuring network transmission correctness, version detection for ensuring that call detail record versions are consistent and serial number detection for ensuring a receiving order of different links;

and only when passing all the detection, the call detail record is received correctly is determined.

Furthermore, when detecting that the call detail record processing module is idle, the charging server sends an address of the received call detail record in a memory to the call detail record processing module;

the call detail record processing module obtains the call detail record corresponding to the address in the memory according to the received address, and processes the call detail record corresponding to the address.

The present invention further provides a system for processing call detail record transmission in a charging system, which comprises: a service processing node and a charging server, the service processing node comprises a call detail record forwarding and stock processing module, and the charging server comprises a call detail record receiving module, a call detail record distribution and stock processing module, and a call detail record processing module, wherein the call detail record forwarding and stock processing module is used to: detect a load status of a transmission link after receiving a call detail record generated by a service program, if the transmission link is idle is detected, send the received call detail record to the charging server; or else store the received call detail record in a first storage area in the service processing node as a stocked call detail record file;

the call detail record receiving module is used to: detect the received call detail record sent by the call detail record forwarding and stock processing module, if the call detail record is received correctly is detected, then forward the call detail record to the call detail record distribution and stock processing module;

the call detail record distribution and stock processing module is used to: detect a load status of the call detail record processing module after receiving the call detail record forwarded by the call detail record receiving module, if the call detail record processing module is idle is detected, send the received call detail record to the call detail record processing module to be processed; or else store the received call detail record in a second storage area in the charging server as a stocked call detail record file;

the call detail record processing module is used to: read the received call detail record, and write into files of different formats after performing encoding, decoding and sorting on the received call detail record.

Furthermore, the call detail record receiving module is further used to: send a transmission success response to the service processing node when detecting that the call detail record is received correctly; or else, send a transmission failure response to the service processing node, and include a request for retransmitting the call detail record in the transmission failure response;

the call detail record forwarding and stock processing module is further used to: if the transmission success response of a sent call detail record is received after sending one call detail record by the transmission link, then set a status of the transmission link to be idle, and wait for sending a next call detail record; if the transmission failure response is received, then retransmit the sent call detail record.

Furthermore, the call detail record receiving module performs following detection on the received call detail record: Cyclic Redundancy Check (CRC) for ensuring network transmission correctness, version detection for ensuring that call detail record versions are consistent and serial number detection for ensuring a receiving order of different links; and only when passing all the detection, determines that the call detail record is received correctly.

Furthermore, the call detail record forwarding and stock processing module is further used to: read a stocked call detail record file in the first storage area to send to the call detail record receiving module by the transmission link if the transmission link is still idle is detected after completing to send all of the received call detail records.

Furthermore, the call detail record distribution and stock processing module is further used to: read a stocked call detail record file in the second storage area to send to the call detail record processing module if the call detail record processing module is still idle after completing to send all the received call detail records to the call detail record processing module.

Compared with the prior art, the method and the system for processing call detail record transmission in a charging system provided by the present invention have the following advantages:

1) the method for processing call detail record transmission in a charging system provided by the present invention can improve the reliability of call detail record transmission by two stages of call detail record stock processing of the service processor and the charging server, and when the call detail record processing program of the charging server does not work because of a fault or the telephone traffic exceeds its performance index, the call detail record is stocked in the charging server, and the stocked call detail record files are not processed until the call detail record processing program is restarted or the telephone traffic is small, and thus the call detail record will not be lost; when the charging server does not work because of a fault or the network link with the service processor is disconnected, the call detail record is stocked in the service processor, and the stocked call detail record files are not processed until the fault is repaired or the link is reconnected, thereby ensuring that the call detail record will not be lost;

2) the system for processing call detail record transmission in a charging system provided by the present invention generates two stages of stocked call detail records by a call detail record forwarding and stock processing module and a call detail record distribution and stock processing module, stocks the call detail records into a file when the telephone traffic of the communication network achieves a peak value, and processes the stocked call detail records when the telephone traffic is low, so that the requirements of the communication link in the charging system and the charging server performance can be decreased and it only needs to satisfy the requirement of the average telephone traffic without satisfying the requirement of the peak value of the telephone traffic, thereby decreasing the cost of network construction and operation of operators and improving the market competitiveness of the charging system;

3) the system for processing call detail record transmission provided by the present invention generates two stages of stocked call detail records by a call detail record forwarding and stock processing module and a call detail record distribution and stock processing module, which decreases the link coupling degree between the service processor and the charging server and is suitable for the charging requirements of varieties of network services.

PREFERRED EMBODIMENTS OF THE PRESENT INVENTION

The basic conception of the present invention is to provide a method and a system for processing call detail record transmission in a charging system, and to ensure the correctness of the call detail record transmission and ensure that the call detail record will not be lost by generating two stages of the stocked call detail records as necessary by the call detail record forwarding and stock processing module on the service processor and the call detail record receiving module and the call detail record distribution and stock processing module on the charging server, so as to decrease the requirement for performances of the network and charging server.

A system for processing call detail record transmission in a charging system provided by the present invention comprises: a call detail record forwarding and stock processing module run on a service processor, a call detail record receiving module, a call detail record processing module, and a call detail record distribution and stock processing module run on a charging server; wherein:

the call detail record forwarding and stock processing module is used to: receive the call detail record generated by a service program, and detect the load status of the transmission link: if the link is not idle, then write the call detail record into a stocked call detail record file in the disk; if the link is idle, then forward the call detail record; if the link is still idle after forwarding the received call detail record, then read and send appropriate amount of call detail records in the stocked call detail record file; it needs to wait for the response of the call detail record receiving module in the charging server, and will not release the link before obtaining the successful response; if the link is blocked, then write all of the call detail records into the stocked call detail record file; furthermore, the module is also responsible for the management of the stocked call detail record file and generating log information of the system for processing call detail record transmission and so on;

the call detail record receiving module is used to: receive a call detail record sent by the service processor, and do a variety of detections on the call detail record so as to ensure the transmission correctness; feed back different responses to the service processor according to the detection results, and transmit the call detail record which has passed the detection to the call detail record distribution and stock processing module;

the call detail record distribution and stock processing module is used to: obtain the call detail record transmitted by the call detail record receiving module, detect the load status of the call detail record processing module, and if the call detail record processing module is not idle, then write the call detail record into the stocked call detail record file in the disk; if the call detail record processing module is idle, then transmit the call detail record to the call detail record processing module; if the call detail record processing module is still idle after distributing the received call detail record, then read the call detail record in the stocked call detail record file to transmit to the call detail record processing module; if the call detail record processing module does not run or the program hangs, then write all of the call detail records into the stocked call detail record file; furthermore, the module is also responsible for the management of the stocked call detail record file and generating log information of the system for processing call detail record transmission and so on;

the call detail record processing module is used to: read the received call detail record, and perform processing such as encoding, decoding, sorting, and write into different format files, wherein different format files include: the original call detail record file encoded by the Abstract Syntax Notation One (ASN.1) format, and the call detail record file in the American Standard Code for Information Interchange (ASCII) format composed by the fields which are needed by the charging center and so on. These functions are different according to the different requirements of different networks and operators, and these functions can be implemented by independent sub modules or the dynamic link library.

A method for processing call detail record transmission in a charging system provided by the present invention mainly uses the following technical scheme:

a. on the service processor, the call detail record generated by a service processing program is transmitted to the call detail record forwarding and stock processing module by the ways of the message-based inter process or the shared memory;

b. on the service processor, the call detail record forwarding and stock processing module detects the load status of the transmission link: if the transmission link is not idle, then writes the received call detail record into the disk as a stocked call detail record file; if the transmission link is idle, then forwards the just received call detail record by the transmission link; if the link is still idle after forwarding the received call detail record, then reads and send the call detail record in the stocked call detail record file by the link; and the call detail record forwarding and stock processing module needs to wait for the response of the call detail record receiving module in the charging server after sending the call detail record by the link, and the link is not released before receiving the success response; if the link is blocked, all the call detail records are written into the disk as the stocked call detail record file;

c. on the charging server, the call detail record receiving module performs a variety of detection on the received call detail record to ensure the correctness of the call detail record transmission; if the detection shows that the call detail record is received correctly, then sends the response for denoting the transmission success to the call detail record forwarding and stock processing module of the service processor, and transmits the received call detail record to the call detail record distribution and stock processing module; if the detection shows that call detail record is received incorrectly, then sends the response for denoting the transmission failure and retransmitting this call detail record to the call detail record forwarding and stock processing module of the service processor;

d. on the charging server, the call detail record distribution and stock processing module detects the load status of the call detail record processing module, if the call detail record processing module is not idle, then writes the received call detail record into the disk as a stocked call detail record file; if the call detail record processing module is idle, then transmits the received call detail record to the call detail record processing module; if the call detail record processing module is still idle after distributing the received call detail record, then reads the call detail record in the stocked call detail record file to transmit to the call detail record processing module; if the call detail record processing does not run or the program hangs, then writes all the call detail records into the disk as the stocked call detail record file;

wherein detecting whether the load of the transmission link is idle specifically comprises: detecting whether the sending buffer of each transmission link has idle space;

wherein a variety of detection done by the charging server on the received call detail records specifically includes: the Cyclic Redundancy Check (CRC) for ensuring whether the network transmission is correct, version detection for ensuring that the call detail records of the front end and the back end are consistent, serial number detection for ensuring the receiving order of different links and the other detection items which should be involved due to the requirements of specific functions;

wherein detecting whether the load status of the call detail record processing module is idle specifically comprises: detecting whether the call detail record buffer of the call detail record processing module has idle space.

Below the method of the present invention will be further described in detail with reference to drawings and the embodiment of the present invention.

Figure 1:
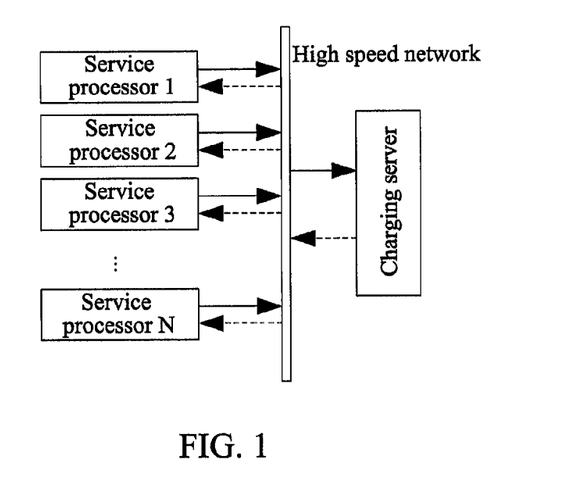
FIG. 1 is a schematic diagram of the composition of the charging system according to the present invention.

FIG. 1 is a schematic diagram of the link in the charging system according to the embodiment of the present invention, as shown in FIG. 1, the charging system comprises two parts of the service processing node (service processor) and the charging server, and N service processors connect the charging server by the network, wherein the connection between the service processor and the charging server includes the Transmission Control Protocol/Internet Protocol (TCP/IP) high speed network connection.

Figure 2:
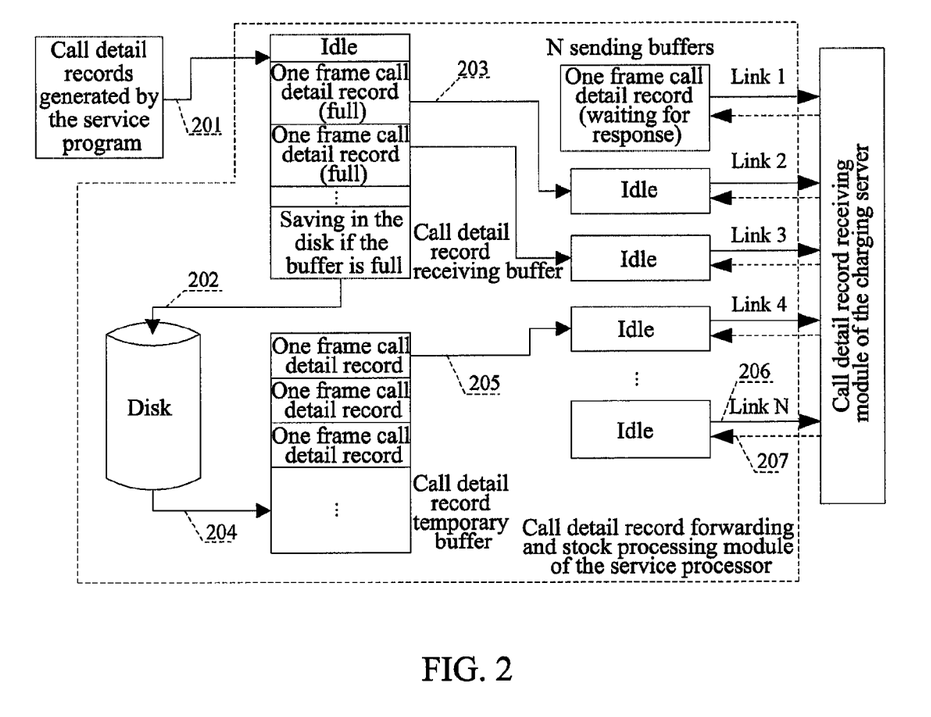
FIG. 2 is a schematic diagram of the processing flow of the call detail record forwarding and stock processing module of the service processor according to the embodiment of the present invention.

FIG. 2 is a schematic diagram of the call detail record forwarding and stock processing module of the service processor according to the embodiment of the present invention, and as shown in FIG. 2, the process for forwarding the call detail record and processing the stock comprises:

step 201: the call detail record generated by the service processing program is transmitted to the call detail record forwarding and stock processing module by the ways of the message-based inter process or the shared memory, and the call detail record forwarding and stock processing module receives the call detail record generated by the service program;

the receiving refers to the call detail record forwarding and stock processing module separates the content of the call detail record included in the message to store into the call detail record receiving buffer of the present module when receiving the message of the service processing program.

Step 202: if the call detail record buffer is already written to be full, then the received call detail record is written into the first storage area (which includes but is not limited to: the storage medium such as the disk and the magnetic array, etc., and it is the disk in the present embodiment) on the service processor as the stocked call detail record file.

The operation of writing the received call detail record into the first storage area as the stocked call detail record file comprises: the management of the stocked call detail record file, and furthermore, it includes but is not limited to: establishing the new file, naming the file, opening the file, and closing the file, etc.

For instance, when a new call detail record is written, the new call detail record can be written into a newly established stocked call detail record file in the first storage area, and the new file can be named according to the date and time of the system, or it can also choose to open an established file into which the new call detail record is written. The size of the single stocked call detail record file has a threshold, and when achieving the threshold, the file is closed and a new stocked call detail record file is established and the new file name is obtained, wherein naming the file can be performed during newly establishing a stocked call detail record file or can also be performed during closing the file.

Step 203: the idle space in the sending buffer is found, and the call detail record in the receiving buffer is written into the idle space;

the idle is determined by the flag bit of each buffer storage unit, each buffer can store a plurality of call detail record structures, and the flag bit of each buffer storage unit is not configured to the idle status until receiving the response of being received correctly after sending the call detail record.

Step 204: when the call detail record temporary buffer has the idle space, a stocked call detail record file is read, and the corresponding call detail record is taken out to be stored into the idle buffer;

the read stocked call detail record file is different from the stocked call detail record file which is opening to be written at this time; if the read file and the written file are the same one, the efficiency will be decreased.

Step 205: if the sending buffer still has idle space after sending all the call detail records in the receiving buffer, then the call detail records in the call detail record temporary buffer are written into the idle space.

Step 206: the call detail records in each sending buffer is sent to the charging server by the corresponding link;

the sending process comprises the processes of re-packing the call detail record and adding the information such as the service processor number, the link number, the call detail record packet serial number, and the call detail record version number, etc.

Step 207: the feedback of the charging server is received;

the feedback comprises: setting the sending buffer of the present link to the idle status after the charging server correctly receiving one call detail record packet, and waiting for sending the next call detail record packet; otherwise, the charging server makes a request for retransmitting the call detail record packet, then the last packet is retransmitted. Obviously, when the telephone traffic is larger, and the charging server cannot receive the call detail record, the network has a fault or the charging server has a fault, the charging server cannot perform feedback, then the sending buffer will not have the idle space all the time, step 203 and step 205 cannot find the idle space in the sending buffer, and step 202 will write the received call detail record into the stocked call detail record file.

Figure 3:
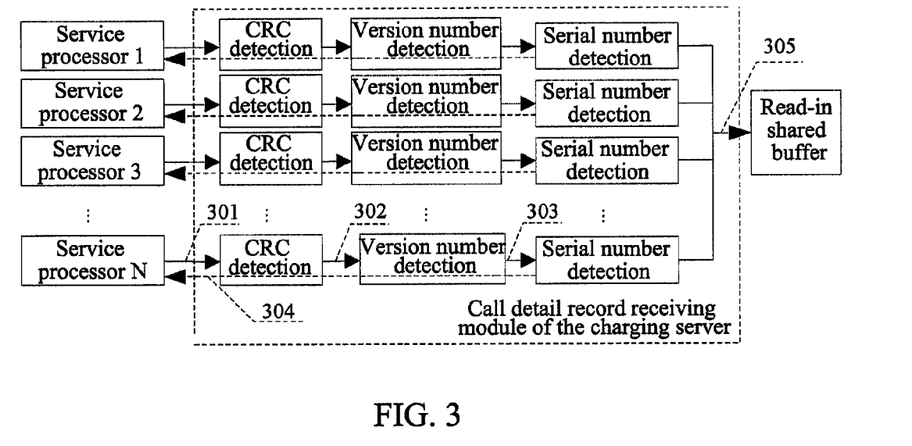
FIG. 3 is a schematic diagram of the processing flow of the call detail record receiving module of the charging server according to the embodiment of the present invention.

FIG. 3 is a schematic diagram of the call detail record receiving module of the charging server according to the embodiment of the present invention, and as shown in FIG. 3, the process for detecting the call detail record receiving comprises:

step 301: the CRC check detection is performed on the call detail record;

step 302: the version of call detail record packet is detected;

step 303: the serial number of the call detail record packet is detected;

wherein each sending link of each service processor has an independent call detail record packet numbering system, which is differentiated when detecting;

step 304: the receiving response is fed back to the service processor;

wherein different responses are fed back to the service processor according to the detection results of the step 301, step 302, and step 303.

Step 305: the call detail record which passes the detection is written into the shared buffer;

wherein the call detail record packet which passes the detection will be unpacked into independent call detail records to be stored into the shared buffer with the call detail record distribution and stock processing module, and if the shared buffer is full, the call detail record distribution and stock processing module will write partial call detail records which are written at last into the stocked call detail record file in the disk.

Figure 4:
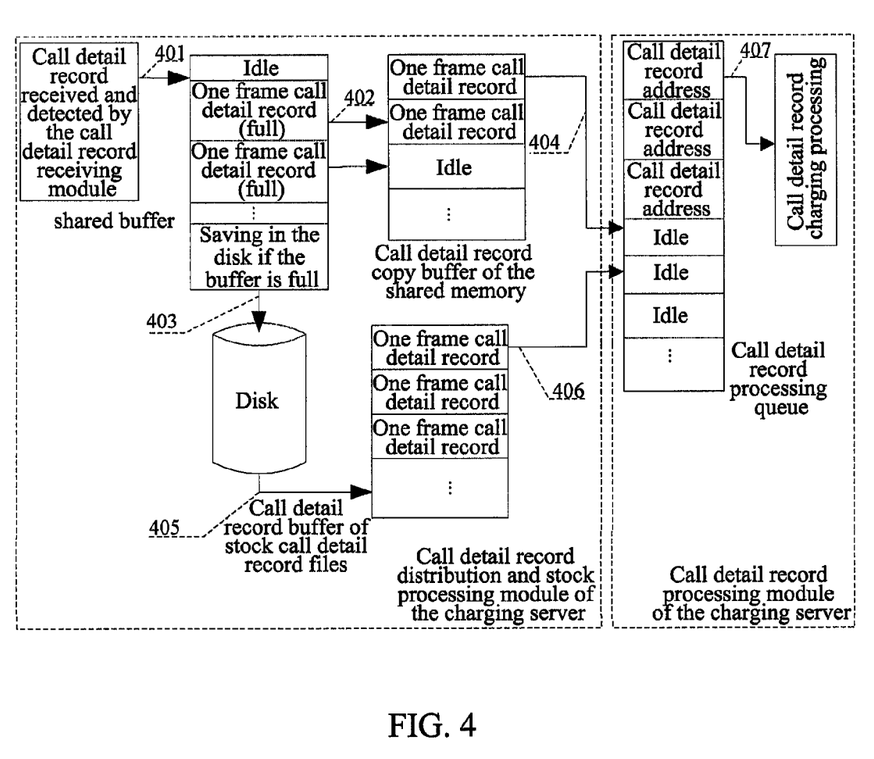
FIG. 4 is a schematic diagram of the processing flow of the call detail record distribution and stock processing module of the charging server according to the embodiment of the present invention.

FIG. 4 is a schematic diagram of the call detail record distribution and stock processing module of the charging server according to the embodiment of the present invention, and as shown in FIG. 4, the process for distributing the call detail record and processing the stock comprises:

step 401: whether the shared buffer has the idle space is judged, if has, then the call detail record which passes the detection is written into the shared buffer, and step 402 is performed; or else, step 403 is performed;

step 402: the call detail record is copied from the shared buffer into the call detail record copy buffer of the shared memory;

the copying premise is that the call detail record copy buffer of the shared memory has the idle space;

step 403: if the shared buffer is full, then partial call detail records which are written into the buffer at last are written into the second storage area (which includes: the storage medium such as the disk and the magnetic array, and it is the disk in this embodiment) of the charging server as the stocked call detail record file;

wherein writing the partial call detail records into the second storage area as the stocked call detail record file comprises the management of the stocked call detail record file, which further comprises: opening the file, closing the file, naming the file, and establishing a new file; the size of the single stocked call detail record file has a threshold, and when achieving the threshold, the file is closed, the new stocked file name is obtained, and the new file is established, etc.;

step 404: the address of the call detail record in the memory is copied to the call detail record processing queue, and the copying premise is that the call detail record processing queue has idle space;

wherein the call detail record processing queue is the processing buffer of the call detail record processing module, and the stored content is the address of the call detail record in the memory but not the specific content of the call detail record. Compared with copying the whole call detail record, only copying the address can decrease the memory operation, and further can improve the performing efficiency.

step 405: when the call detail record buffer of the stocked call detail record file has idle space, one stocked call detail record file is read, and the corresponding call detail records are taken out and are stored into the idle buffer;

the read stocked call detail record file is different from the stocked call detail record file which is opening to be written at this time; if the read file and written file are the same one, the efficiency will be decreased.

step 406: the call detail record address of the call detail record buffer of the stocked call detail record file is copied to the call detail record processing queue;

wherein the copying premise is the call detail record processing queue has idle space.

step 407: the call detail record processing module reads the call detail record address in call detail record processing queue to obtain and process the call detail record;

wherein the call detail record processing module will configure the corresponding space in the call detail record processing queue to be idle after processing the call detail record, and at the same time, configure the spaces in the call detail record buffer of the stocked call detail record file and call detail record copy buffer of the shared memory corresponding to the corresponded call detail record to be idle. Furthermore, if the speed of processing the call detail record is low, then the possibility of occurrence of the idle spaces in the call detail record buffer of the stocked call detail record file and the call detail record copy buffer of the shared memory will be low, then step 402 and step 405 will not act, and furthermore, step 402 will not act either, and then the call detail record will be written into the stocked call detail record file by step 403. The processing process will equal to the foregoing steps when the call detail record processing module does not run or has a fault.

Of course, the present invention can further have other various embodiments, various corresponding modifications and transformations can be made to the present invention without departing from the spirit and essence of the present invention by the skilled in the art, and these corresponding modifications and transformations should all fall into the protection scope of appended claims of the present invention.

INDUSTRIAL APPLICABILITY

The system for processing call detail record transmission provided by the present invention generates two stages of stocked call detail records by a call detail record forwarding and stock processing module and a call detail record distribution and stock processing module, which decreases the link coupling degree between the service processor and the charging server and is suitable for the charging requirements of varieties of network services.

What is claimed is:

1. A method for processing call detail record transmission in a charging system comprising:

a service processing node detecting a load status of a transmission link after receiving a call detail record generated by a service program, when the transmission link is idle is detected, sending the received call detail record to a charging server; or else storing the received call detail record in a first storage area in the service processing node as a stocked call detail record file; and the charging server detecting a load status of a call detail record processing module after receiving the call detail record sent by the service processing node, when the call detail record processing module is idle is detected, sending the received call detail record to the call detail record processing module to be processed; or else storing the received call detail record in a second storage area in the charging server as a stocked call detail record file;

the call detail record processing module reading the received call detail record, and writing into files of different formats after performing encoding, decoding and sorting on the received call detail record.

2. The method according to claim 1, before the step of the charging server detecting the load status of the call detail record processing module, further comprising:

the charging server detecting the received call detail record, when the call detail record is received correctly is detected, then sending a transmission success response to the service processing node; or else, sending a transmission failure response to the service processing node, and including a request for retransmitting the call detail record in the transmission failure response; and after the service processing node sending one call detail record by the transmission link, when the transmission success response of the sent call detail record is received, then setting a status of the transmission link to be idle, waiting for sending a next call detail record; when the transmission failure response is received, then retransmitting the sent call detail record.

3. The method according to claim 2, further comprising:
after the service processing node completing to send all of the received call detail records, when the transmission link is still idle is detected, then reading a stocked call detail record file in the first storage area to send to the charging server by the transmission link.

4. The method according to claim 3, further comprising:
after the service processor sending one call detail record in the stocked call detail record file at each time and receiving the transmission success response of the stocked call detail record, deleting the stocked call detail record file corresponding to the stocked call detail record in the first storage area.

5. The method according to claim 1, wherein
the transmission link is idle refers that a sending buffer of the transmission link has an idle space.

6. The method according to claim 1, wherein
the call detail record processing module is idle refers that a processing buffer of the call detail record processing module has an idle space.

7. The method according to claim 1, further comprising:
after the charging server completing to send all the received call detail records to the call detail record processing module, when the call detail record processing module is still idle is detected, then reading a stocked call detail record file in the second storage area to send to the call detail record processing module.

8. The method according to claim 2, wherein
the step of the charging server detecting the received call detail record comprises: the charging server performing Cyclic Redundancy Check (CRC) for ensuring network transmission correctness, version detection for ensuring that call detail record versions are consistent and serial number detection for ensuring a receiving order of different links;
and only when passing all the detection, determining that the call detail record is received correctly.

9. The method according to claim 1, wherein the step of the charging server sending the received call detail record to the call detail record processing module to be processed comprises: the charging server sending an address of the received call detail record in a memory to the call detail record processing module;
after the step of the charging server sending the address of the received call detail record in the memory to the call detail record processing module, the method further comprises: the call detail record processing module obtaining the call detail record corresponding to the address in the memory according to the received address, and processing the call detail record corresponding to the address.

10. A system for processing call detail record transmission in a charging system comprising: a service processing node and a charging server, the service processing node comprising a call detail record forwarding and stock processing module, and the charging server comprising a call detail record receiving module, a call detail record distribution and stock processing module, and a call detail record processing module, wherein
the call detail record forwarding and stock processing module is configured to: detect a load status of a transmission link after receiving a call detail record generated by a service program, when the transmission link is idle is detected, send the received call detail record to the charging server; or else store the received call detail record in a first storage area in the service processing node as a stocked call detail record file;

the call detail record receiving module is configured to: detect the received call detail record sent by the call detail record forwarding and stock processing module, when the call detail record is received correctly is detected, then forward the call detail record to the call detail record distribution and stock processing module;

the call detail record distribution and stock processing module is configured to: detect a load status of the call detail record processing module after receiving the call detail record forwarded by the call detail record receiving module, when the call detail record processing module is idle is detected, send the received call detail record to the call detail record processing module to be processed; or else store the received call detail record in a second storage area in the charging server as a stocked call detail record file;

the call detail record processing module is configured to: read the received call detail record, and write into files of different formats after performing encoding, decoding and sorting on the received call detail record.

11. The system according to claim 10, wherein
the call detail record receiving module is further configured to: send a transmission success response to the service processing node when detecting that the call detail record is received correctly; or else, send a transmission failure response to the service processing node, and include a request for retransmitting the call detail record in the transmission failure response;

the call detail record forwarding and stock processing module is further configured to: if when the transmission success response of a sent call detail record is received after sending one call detail record by the transmission link, then set a status of the transmission link to be idle, and wait for sending a next call detail record; when the transmission failure response is received, then retransmit the sent call detail record.

12. The system according to claim 10, wherein
the call detail record receiving module is further configured to: perform following detection on the received call detail record: Cyclic Redundancy Check (CRC) for ensuring network transmission correctness, version detection for ensuring that call detail record versions are consistent and serial number detection for ensuring a receiving order of different links; and only when passing all the detection, determining that the call detail record is received correctly.

13. The system according to claim 10, wherein,
the call detail record forwarding and stock processing module is further configured to: read a stocked call detail record file in the first storage area to send to the call detail record receiving module by the transmission link when the transmission link is still idle is detected after completing to send all of the received call detail records.

14. The system according to claim 10, wherein
the call detail record distribution and stock processing module is further configured to: read a stocked call detail record file in the second storage area to send to the call detail record processing module when the call detail record processing module is still idle after completing to send all the received call detail records to the call detail record processing module.

15. The method according to claim 2, further comprising:
after the charging server completing to send all the received call detail records to the call detail record processing module, when the call detail record processing module is still idle is detected, then reading a stocked call detail record file in the second storage area to send to the call detail record processing module.

16. The method according to claim 3, further comprising:
after the charging server completing to send all the received call detail records to the call detail record processing module, when the call detail record processing module is still idle is detected, then reading a stocked call detail record file in the second storage area to send to the call detail record processing module.

17. The method according to claim 4, further comprising:
after the charging server completing to send all the received call detail records to the call detail record processing module, when the call detail record processing module is still idle is detected, then reading a stocked call detail record file in the second storage area to send to the call detail record processing module.

18. The method according to claim 6, further comprising:
after the charging server completing to send all the received call detail records to the call detail record processing module, when the call detail record processing module is still idle is detected, then reading a stocked call detail record file in the second storage area to send to the call detail record processing module.

19. The method according to claim 6, wherein the step of the charging server sending the received call detail record to the call detail record processing module to be processed comprises: the charging server sending an address of the received call detail record in a memory to the call detail record processing module;
after the step of the charging server sending the address of the received call detail record in the memory to the call detail record processing module, the method further comprises: the call detail record processing module obtaining the call detail record corresponding to the address in the memory according to the received address, and processing the call detail record corresponding to the address.

20. The system according to claim 11, wherein
the call detail record receiving module is further configured to: perform following detection on the received call detail record: Cyclic Redundancy Check (CRC) for ensuring network transmission correctness, version detection for ensuring that call detail record versions are consistent and serial number detection for ensuring a receiving order of different links; and only when passing all the detection, determining that the call detail record is received correctly.

* * * * *